US010852162B2

(12) United States Patent
Krone et al.

(10) Patent No.: US 10,852,162 B2
(45) Date of Patent: Dec. 1, 2020

(54) ACTUATING DEVICE

(71) Applicant: FESTO AG & Co. KG, Esslingen (DE)

(72) Inventors: Arnold Krone, Goppingen (DE); Bernd Beuth, Goppingen (DE)

(73) Assignee: FESTO SE & CO. KG, Esslingen (DE)

( * ) Notice: Subject to any disclaimer, the term of this patent is extended or adjusted under 35 U.S.C. 154(b) by 44 days.

(21) Appl. No.: 16/099,283

(22) PCT Filed: May 5, 2017

(86) PCT No.: PCT/EP2017/060779
§ 371 (c)(1),
(2) Date: Nov. 6, 2018

(87) PCT Pub. No.: WO2017/194407
PCT Pub. Date: Nov. 16, 2017

(65) Prior Publication Data
US 2019/0212170 A1      Jul. 11, 2019

(30) Foreign Application Priority Data
May 10, 2016   (DE) .................. 10 2016 207 982

(51) Int. Cl.
*G01D 5/14*      (2006.01)
(52) U.S. Cl.
CPC .................... *G01D 5/145* (2013.01)
(58) Field of Classification Search
CPC .. G01R 31/007; G01R 31/086; G01R 31/025; B60R 16/02; B60L 11/1816; B60L 11/02; B60L 2270/00; B60L 2210/14; B60L 2210/12; Y10S 903/903
USPC ......................... 324/503, 500, 509
See application file for complete search history.

(56) References Cited

U.S. PATENT DOCUMENTS

| | | | | |
|---|---|---|---|---|
| 5,808,449 A | * | 9/1998 | Hirayama | H02J 3/46 |
| | | | | 322/20 |
| 2005/0279607 A1 | * | 12/2005 | Fusegi | F16D 27/118 |
| | | | | 192/84.96 |
| 2011/0068631 A1 | * | 3/2011 | Roscoe | H02J 3/38 |
| | | | | 307/69 |

(Continued)

FOREIGN PATENT DOCUMENTS

| | | |
|---|---|---|
| DE | 102006049401 | 4/2008 |
| DE | 102008014506 | 9/2009 |

(Continued)

*Primary Examiner* — Giovanni Astacio-Oquendo
(74) *Attorney, Agent, or Firm* — Hoffman & Baron, LLP

(57) ABSTRACT

An actuating device including a drive device and a monitoring device. The drive device includes an adjusting assembly which can be moved along a straight movement line and which has an adjusting body and a magnetic adjusting element that can be rotatably mounted on the adjusting body. The monitoring device includes a sensor device which is used to detect at least one position of the magnetic adjusting element along the straight movement line. The monitoring device has a magnetic aligning assembly which is arranged such that the adjusting element assumes a specified rotational position relative to the sensor device on the basis of a magnetic interaction between the adjusting element and the aligning assembly.

12 Claims, 5 Drawing Sheets

(56) References Cited

U.S. PATENT DOCUMENTS

| | | | |
|---|---|---|---|
| 2011/0095603 A1* | 4/2011 | Lee | B60L 50/51 307/10.1 |
| 2011/0316473 A1* | 12/2011 | Yen | H02J 7/027 320/107 |
| 2013/0063231 A1* | 3/2013 | Tomimbang | H01F 7/124 335/127 |
| 2016/0169215 A1* | 6/2016 | Tetzlaff | F04B 17/03 417/53 |
| 2016/0294213 A1* | 10/2016 | Morrison | H02J 9/061 |
| 2018/0164128 A1* | 6/2018 | Creech | G01D 5/145 |

FOREIGN PATENT DOCUMENTS

| | | |
|---|---|---|
| DE | 102008018432 | 10/2009 |
| DE | 102012003230 | 3/2013 |
| EP | 2792919 | 10/2014 |
| WO | WO0150091 | 7/2001 |
| WO | WO02093058 | 11/2002 |

\* cited by examiner

ACTUATING DEVICE

This application claims priority based on an International Application filed under the Patent Cooperation Treaty, PCT/EP2017/060779, filed on May 5, 2017, which claims priority to DE 10 2016 207 982.4 filed on May 10, 2016.

BACKGROUND OF THE INVENTION

The invention relates to an actuator apparatus with a drive device and a monitoring device, wherein the drive device comprises an actuator arrangement displaceable along a movement straight line, the actuator arrangement having an actuator body and a magnetic actuator element which is rotationally mounted on the actuator body, and wherein the monitoring device comprises a sensor device which serves to detect at least one position of the magnetic actuator element along the movement straight line.

The aforementioned actuator apparatus can for example be a process valve assembly, which comprises a valve drive as drive device and a valve control head as monitoring device, and which also has a valve fitting. The monitoring device can also be designed as a positioner and/or electrical feedback unit. The valve drive serves to adjust the setting of a valve member by means of displacement of the actuator arrangement, which is designed for example as a piston arrangement. The above-mentioned sensor device is used to detect the position of the magnetic actuator element provided on the actuator arrangement. The set position of the valve member can be deduced from the position of the actuator element.

In the case of the actuator apparatus mentioned in the introduction, the problem may arise that the rotational position of the actuator element changes relative to the sensor device. This can lead to a reduction of the accuracy with which the sensor device detects the position of the actuator element.

A magnetic sensor system for detecting a displacement of a valve shaft is known from EP 2792 919 A1. The magnetic sensor system comprising a series of magnetic field sensors distributed along a longitudinal axis. The valve shaft is rotationally coupled to a valve base and comprises a magnetic support. A magnetic field source is arranged on the magnetic support. In order to align the magnetic field source to a predetermined angular position relative to the magnetic field sensors, an angular control element that is slidably coupled to a longitudinal index slit in the housing is provided on the valve shaft. In this way a change of the rotational position of the magnetic field source relative to the magnetic field sensors is prevented.

A problem with this sensor system known from the prior art is that the actuator element has to be aligned relative to the index slit during the assembly of the sensor system, so that it can be inserted into the index slit. This is awkward especially in a difficult installation environment, and in the event of improper handling can cause damage to the components to be brought into engagement.

SUMMARY OF THE INVENTION

The object of the present invention is to modify the actuator apparatus mentioned in the introduction so as to ensure a high accuracy of the position detection without further complicating the assembly of the actuator apparatus.

This object is achieved with the features specified in the characterising part of claim 1. According to the invention the monitoring device comprises a magnetic alignment arrangement, which is arranged in such a way that the actuator element adopts, on account of a magnetic interaction between the actuator element and the alignment arrangement, a predetermined rotational position relative to the sensor device.

The alignment of the actuator element in its rotational position relative to the sensor device is produced by a magnetic interaction and thus takes place in a contactless manner. For this reason, in contrast to the aforementioned prior art it is not necessary to carry out a manual alignment of the actuator element during assembly, and the installation cost and effort is therefore not increased by the described measures. At the same time, the alignment arrangement according to the invention means that the actuator element adopts a predetermined rotational position relative to the sensor device, so that a good accuracy in the position detection can be ensured.

The monitoring device is in particular detachably mounted on the drive device. In this connection the term "rotational position" means in particular a rotational orientation of the actuator element about the movement straight line or about an axis of rotation parallel to the movement straight line. Preferably the actuator element is rotationally mounted relative to the actuator body about the movement straight line or about an axis of rotation parallel to the movement straight line.

Advantageous further developments are the subject matter of the sub-claims.

Preferably the sensor device serves to detect the at least one position of the actuator element based on a magnetic interaction between the actuator element and the sensor device.

The magnetic field generated by the actuator element thus serves two different purposes—on the one hand it serves to ensure the predetermined rotational position of the actuator element relative to the sensor device and, on the other hand it serves to detect the position of the actuator element.

The sensor device is preferably a magnetic sensor device, such as for example a magnetic foil potentiometer. The sensor device is in particular formed elongated. The sensor device provides a signal that depends on which location the sensor device is permeated by the magnetic field of the actuator element. The signal that is provided thus depends in particular on the position of the actuator element along the movement straight line. The signal provided can for example indicate an impedance, preferably an electrical resistance. Furthermore, the signal provided can be a feedback in the form of an electrical signal, for example an electric voltage.

The sensor device serves to detect at least one position of the actuator element along the movement straight line. Preferably the at least one position is an end position of the actuator arrangement. Two or more positions can preferably also be determined by means of the sensor device, such as for example two end positions of the actuator arrangement. The sensor device can furthermore also serve in the manner of a displacement sensor to continuously detect the position of the actuator element along the movement straight line.

According to a preferred embodiment the actuator element comprises a permanent magnet. In particular the actuator element is designed as a ring magnet or as a bar magnet.

The use of a permanent magnet represents a simple and practical possibility for providing the magnetic field that is required for the alignment of the actuator element and for the detecting the position of the actuator element. If the actuator element is designed as a ring magnet, this ring magnet can for example be aligned with its axis of symmetry parallel to the movement straight line and can be diametrically magnetised—i.e. perpendicular to the axis of symmetry. If the actuator element is designed as a bar magnet, this bar magnet can for example be aligned with its axis of symmetry perpendicular to the movement straight line and can be magnetised axially—i.e. perpendicular to the axis of symmetry.

According to a preferred embodiment the alignment arrangement contains a ferromagnetic material, preferably iron. Expediently the alignment arrangement contains soft magnetic material. In particular, the alignment arrangement is designed as a rod-shaped ferromagnet.

An alignment arrangement of ferromagnetic material causes the magnetic actuator element to be aligned relative to the alignment arrangement. In particular the actuator element aligns itself in such a way that the alignment arrangement is located in a region of maximum flux density of the magnetic field of the actuator element. In this way a specific orientation of the actuator element can be established.

According to an embodiment the magnetic alignment arrangement and/or the sensor device are formed elongated and run parallel to the movement straight line.

In this way it is achieved that the predetermined rotational position of the actuator element relative to the sensor device can be ensured over a certain range along the movement straight line.

The actuator device expediently has an elongated support structure, which at least partially surrounds the actuator element and whose longitudinal axis is aligned parallel to the movement straight line.

Preferably the support structure is formed substantially as a hollow cylinder, wherein a partial section of the hollow cylinder can remain open along the circumference. At least one part of the actuator arrangement, namely the part that comprises the actuator element, is arranged in the support structure and can be displaced along the longitudinal axis of the support structure.

According to a preferred embodiment the sensor device and/or the alignment arrangement are arranged in a respective receptacle in the support structure. The alignment arrangement is designed for example as a cylinder and accordingly is provided in a receptacle designed as a cylindrical groove. The sensor device is formed for example in the shape of a strip or plate and is arranged in a correspondingly designed receiving chamber.

In a preferred development the pole direction of the magnetic field generated by the actuator element is aligned not parallel, in particular perpendicular, to the movement straight line.

This orientation of the magnetic field enables a sensor device and/or orientation arrangement arranged parallel to the movement straight line to be permeated by a pole region or a region of maximum magnetic flux density of the magnetic field generated by the actuator element. This is advantageous for detecting both the position and the orientation of the actuator element.

According to a preferred embodiment the sensor device is arranged opposite the alignment arrangement, so that a straight line passing through the sensor device and the alignment arrangement preferably intersects the movement straight line.

In particular the sensor device and the alignment arrangement arranged with respect to one another in such a way that the sensor device and the alignment arrangement can be simultaneously permeated by a magnetic field region of maximum flux density. Preferably the sensor device and the alignment arrangement are arranged relative to one another in such a way that the sensor device is arranged in the region of a first pole of the magnetic field generated by the actuator element and the alignment arrangement is arranged in the region of a second pole of the magnetic field.

The drive device comprises for example a valve drive. The monitoring device comprises for example a valve control head, a positioner and/or an electric feedback unit.

The actuator device can further comprise a valve fitting with a valve member that is coupled to the actuator arrangement, so that the setting of the valve member can be adjusted by displacing the actuator arrangement along the movement straight line.

Furthermore the actuator body can comprise a piston arrangement with a shaft section, wherein the actuator element is preferably arranged on a distal end of the shaft section.

BRIEF DESCRIPTION OF THE DRAWINGS

An advantageous embodiment of the invention is represented in the drawing, in which.

DETAILED DESCRIPTION OF THE PREFERRED EMBODIMENTS

Figure 1:
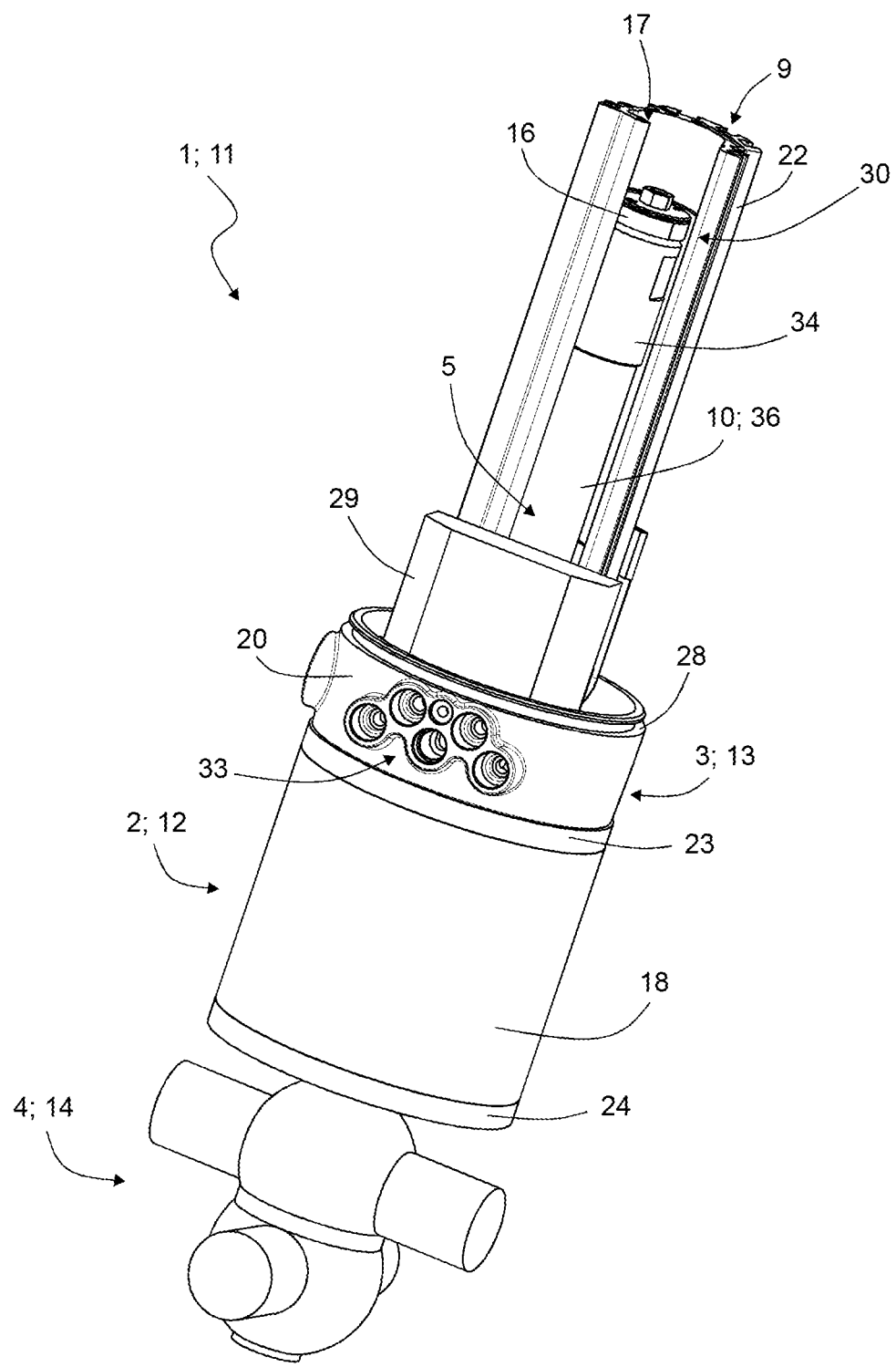
FIG. 1 shows a perspective representation of an actuator device designed as a process valve assembly.
Figure 2:
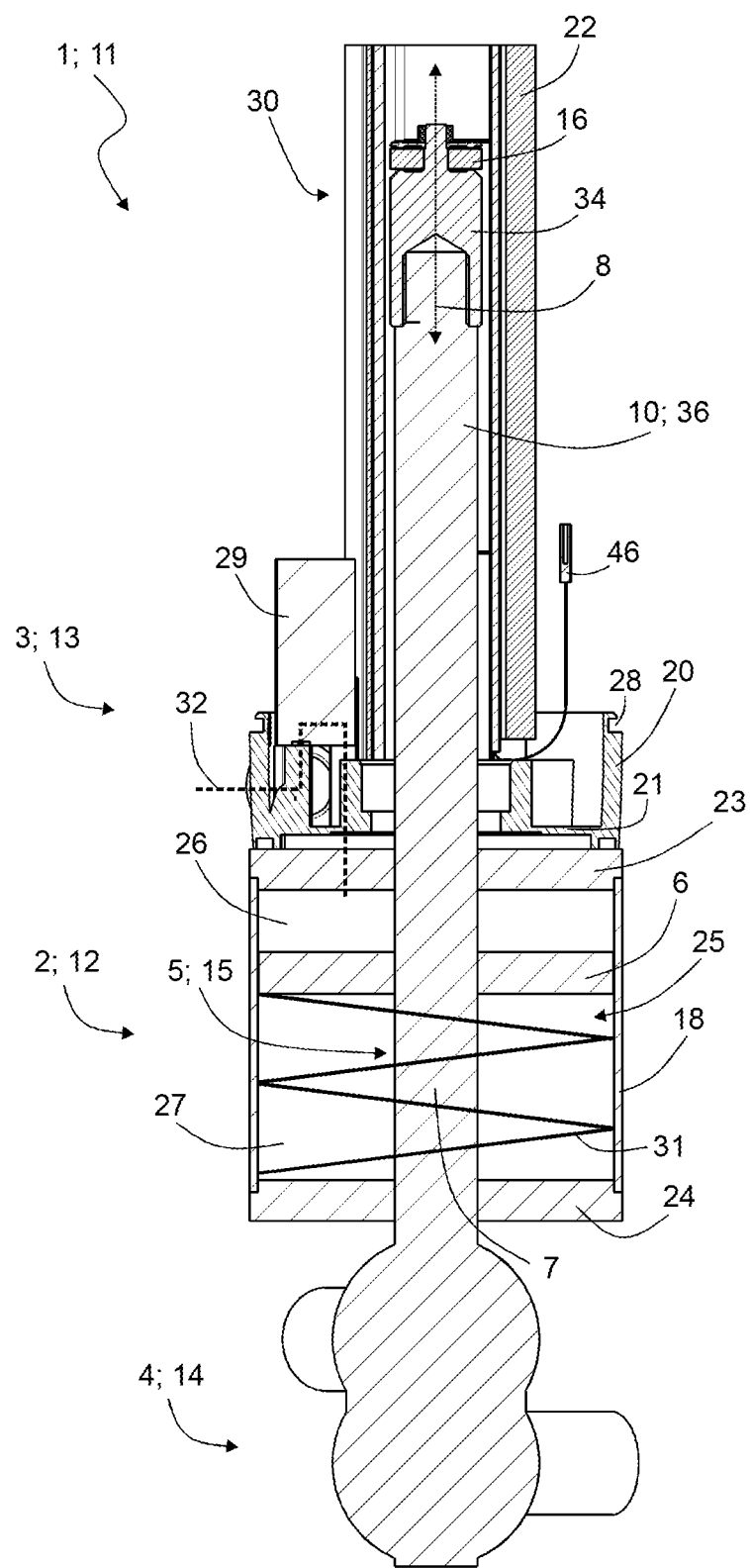
FIG. 2 shows a sectional representation of the actuator device shown in FIG. 1.

FIGS. 1 and 2 show an actuator apparatus 1, which comprises a drive device 2, a monitoring device 3 and also an actuator device 4. In the illustrated example the actuator apparatus 1 is shown by way of example as a process valve assembly 11; corresponding to this, the drive device 2 is designed by way of example as a valve drive 12, and the monitoring device 3 is designed by way of example as a valve control head 13, and the actuator device 4 is designed by way of example as a valve fitting 14.

The actuator apparatus 1 serves to move an actuator member, not shown, of the actuator device 4 between at least two positions. In the discussed example the actuator element is a valve member, which serves to influence the flow of a fluid flowing through the actuator device 4. To this end the actuator member can for example be moved between a blocking position and an open position.

The movement of the actuator member takes place via an actuator arrangement 5 of the drive device 2. In the example discussed the actuator arrangement comprises an actuator body 10, which has a piston arrangement 15 and a shaft section 36. The piston arrangement 15 comprises a piston 6 and a piston rod 7. The actuator member is mechanically coupled to the actuator arrangement 5; preferably the actuator member is fastened to the actuator arrangement 5. In this way the position of the actuator member can be altered by a movement of the actuator arrangement 5. The actuator arrangement 5 can in this connection be displaced along a movement straight line 8 drawn in the FIG. 2. In the illustrated example the actuator arrangement 5 extends in the direction of the movement straight line 8.

The monitoring device 3 serves to detect at least one position of the actuator arrangement 5 along the movement straight line 8. Owing to the coupling between the actuator arrangement 5 and the actuator member the setting of the actuator member can be deduced from the position of the actuator arrangement 5.

The actuator arrangement 5 comprises a magnetic actuator element 16, which is rotationally mounted on the actuator body 10. In this connection the actuator element 16 is mounted so as to be rotatable about the movement straight line 8. The magnetic actuator element generates a magnetic field The monitoring device 3 has a sensor device 9. The sensor device 9 responds to the magnetic field generated by the magnetic control element 16 and provides a signal from which at least one position of the actuator element 16 along the movement straight line 8 can be deduced. The sensor device 9 is formed for example as a magnetic foil potentiometer and provides a signal that indicates an impedance, preferably an electrical resistance, from which the position of the actuator element 16 relative to the sensor device 9 can be deduced. The signal is for example an electrical signal, in particular a voltage signal.

In order to be able to detect the position of the actuator element 16 as accurately as possible, it is desirable that the actuator element 16 has a predetermined rotational position relative to the sensor device 9.

The actuator element is magnetised perpendicular to the movement straight line 8, i.e. the magnetisation of the actuator element is not circularly symmetrical with respect to the movement straight line 8. Consequently, with a change in the rotational position of the actuator element 16 relative to the sensor device 9 the magnetic field that the sensor 9 experiences also changes. This complicates the accurate detection of the position of the actuator element 16 by means of the sensor device 9. It is therefore desirable that the actuator element 16 has a predetermined rotational position relative to the sensor device 9.

A predetermined rotational position of the actuator element 16 relative to the sensor device 9 can generally not be readily ensured, since the actuator body 10 is typically subject to certain rotational movements which lead to the piston arrangement 15 rotating relative to the monitoring device 3, and therefore also relative to the sensor device 9.

According to the invention, the desired alignment of the actuator element 16 relative to the sensor device 9 is achieved in that the monitoring device 3 comprises a magnetic alignment arrangement 17, which on account of a magnetic interaction with the magnetic actuator element 16 causes the actuator element 16 to adopt the predetermined rotational position relative to the sensor device 9. In this way a precise detection of the position can be ensured.

The rotationally movable bearing of the actuator element 16 on the actuator body 10 has the effect that the actuator element 16 is rotationally decoupled from the actuator body 10, so that the entire actuator body 10 does not have to be aligned in order to achieve the desired rotational alignment of the actuator element 16, and in particular also no torques acting on the actuator body 10 have to be overcome.

In the following the structural design of the actuator apparatus 1 will first be explained in greater detail. The individual components of the actuator apparatus 1 are then discussed in detail.

As shown in FIG. 1, the actuator apparatus 1 has an elongated basic shape. The movement straight line 8 runs parallel to the longitudinal axis of this basic shape. The direction of the longitudinal axis of the basic shape of the actuator apparatus 1 and the direction of the movement straight line 8 will also be referred to below as the axial direction.

The drive device 2 has a cylindrical main body 18, through which the actuator arrangement 5 runs, as shown in FIG. 2.

The main body 18 has the covers 23 and 24 at its two end faces. A cylindrical piston chamber 25 is provided in the interior of the main body 18, which is bounded in the axial direction by the two covers 23 and 24. The piston arrangement 15 with the piston 6 and the piston rod 7 is linearly movable mounted in the piston chamber 25 in the direction of the movement straight line. The piston 6 divides the piston chamber 25 into a first chamber 26 and a second chamber 27. At least one of the two chambers 26 and 27 is designed as a pressure chamber and can be pressurised in order to drive the piston 6. The other of the two chambers 26 and 27 can be provided with a return spring 31. In this case the drive device 2 represents a single-acting cylinder. In FIG. 2 a return spring 31 is schematically indicated in the chamber 27. If the chamber 26 that can be pressurised is not subjected to pressure, the return spring 31 returns the piston 6 to a rest position.

Alternatively or additionally to this, the chamber 27 can likewise be designed as a pressure chamber and can be subjected to pressure to drive the piston 6. In this case the drive device 2 represents a double-acting cylinder.

When a drive takes place by means of a single-acting cylinder, it can happen that the actuator arrangement 5, in the case of a linear movement that leads to a compression/decompression of the return spring 31, is additionally forced by the return spring 31 to execute a rotational movement about the axial direction of the actuator arrangement 5, so that the actuator arrangement 5 rotates by several angular seconds. This factor reinforces the problem that the actuator element 16 without the measures according to the invention will change its rotational position relative to the sensor device 9, as a result of which the accuracy of the position determination is adversely affected.

The described piston arrangement 15 is part of the actuator arrangement 5, which, as already mentioned before, extends through the main body 18. The actuator arrangement 5 protrudes from the main body 18 through corresponding openings provided on the two covers 23, 24 on both end faces. The actuator arrangement 5 is of elongated shape and is aligned in the axial direction of the main body 18.

The monitoring device 3 is mounted on a first end face of the main body 18. The monitoring device 3 includes a first cylindrical housing section 20, which can have approximately the same diameter as the cylindrical main body 18 of the drive device 2, and is mounted in coaxial alignment on the main body 18.

In a preferred refinement the drive device 2 and/or the monitoring device 3 is designed so that the monitoring device 3 can be fastened to the drive device 2 in any desired rotational orientation relative thereto. Preferably the drive device 2 and/or the monitoring device 3 have for this purpose a connection interface formed circularly symmetrically around the movement straight line 8. Since the actuator element 16 automatically aligns itself with the alignment arrangement 17 on account of the magnetic interaction, the monitoring device 3 can be attached to the drive device 2 in any desired rotational orientation. The aforementioned rotational orientation of the monitoring device 3 refers in particular in this connection to the movement straight line 8.

The first cylindrical housing section 20 has a base plate 21 which faces the drive device 2, and from which a substantially hollow-cylindrically formed support structure 22 extends in the direction away from the drive device 2. The support structure 22 is arranged in the axial direction of the main body 18 and of the first housing section 20.

The first cylindrical housing section 20 has a circumferential collar 28 in the region of its end face facing away from the drive device 2, on which a second cylindrical housing section (not shown in the figures) can be attached so as to be able to form with the first cylindrical housing section 20 a housing.

FIG. 2 furthermore shows by way of example a control valve arrangement 29, which protrudes from the first housing section in the axial direction of the first housing section. The control valve arrangement 29 can be connected to a pressure source via a fluid connection 33 provided on the outside of the first housing section 20 and is designed to open or close a fluid connection to at least one of the chambers 26 or 27 in response to a control signal, in order thereby to apply pressure to the at least one chamber and effect a drive of the piston 6.

An opening is provided in the base plate 21 of the monitoring device 3, through which the actuator arrangement 5 extends into the support structure 22. In the illustrated example, in which the actuator arrangement 5 comprises a shaft section, the shaft section 36 extends in this case into the support structure 22. The shaft section 36 is preferably of cylindrical shape.

The magnetic actuator element 61 is attached to a distal end 30 of the actuator body 10 or shaft section 36. The magnetic actuator element 16 can however in principle also be attached to any other region of the actuator body 10 or shaft section 36 within the support structure 22.

The sensor device 9 and the alignment arrangement 17 are fastened to the support structure 22. The sensor device 9 and the alignment arrangement 17 are of elongated shape and are aligned parallel to the movement straight line 8 and to the axial direction. The sensor device 9 and the alignment arrangement 17 are provided in the same axial region of the support structure 22, and specifically in the axial region in which also the actuator element 16 is located in operation. Preferably the sensor device 9 and the alignment arrangement 17 are arranged at a distal end of the support structure 22.

In the illustrated example the stroke of the actuator arrangement 5 is limited by the piston chamber 25. This also results in a restricted axial region within the support structure 22, in which the actuator element 16 can lie. Preferably the sensor device 9 and the alignment arrangement 17 are provided in this axial region, so that the position of the actuator element 16 can be detected over the entire stroke of the actuator arrangement 5.

Owing to the fact that the sensor device 9 and the alignment arrangement 17 are aligned parallel to the movement straight line 8, the distances between the actuator element 16 and the sensor device 9 or alignment arrangement 17 remain constant, so long as the actuator element 16 is located in the said axial region along the movement straight line 8, in which the sensor device 9 and the alignment arrangement 17 are provided.

The actuator device 4, which is designed as a valve fitting 14, is located on the end face of the drive device 2 facing away from the monitoring device 3. The actuator arrangement 5 led out from the drive device 2 is connected to an actuator member, not shown, of the actuator device 4.

Figure 3:
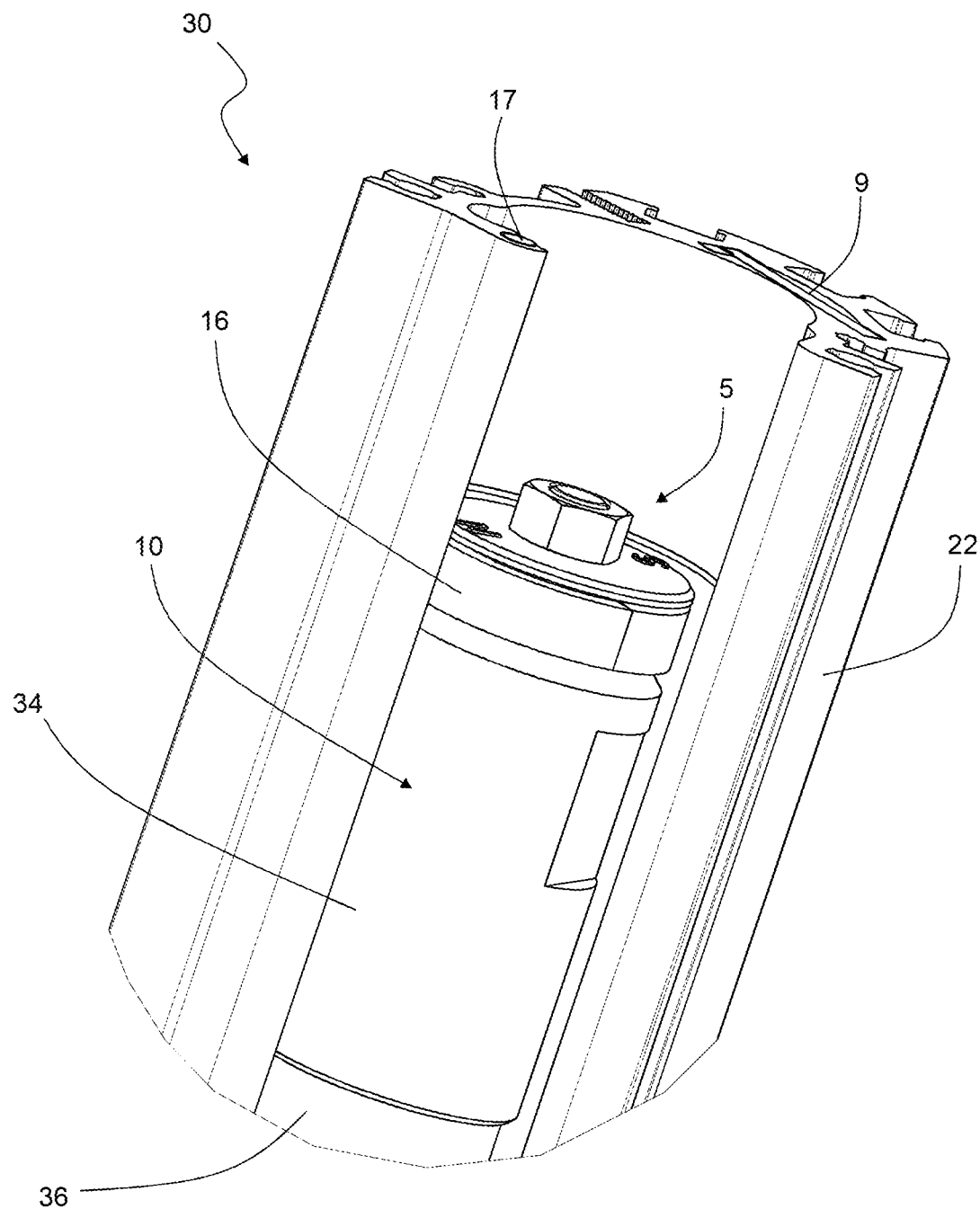
FIG. 3 shows a perspective view of a distal end of an actuator arrangement and a support structure.
Figure 4:
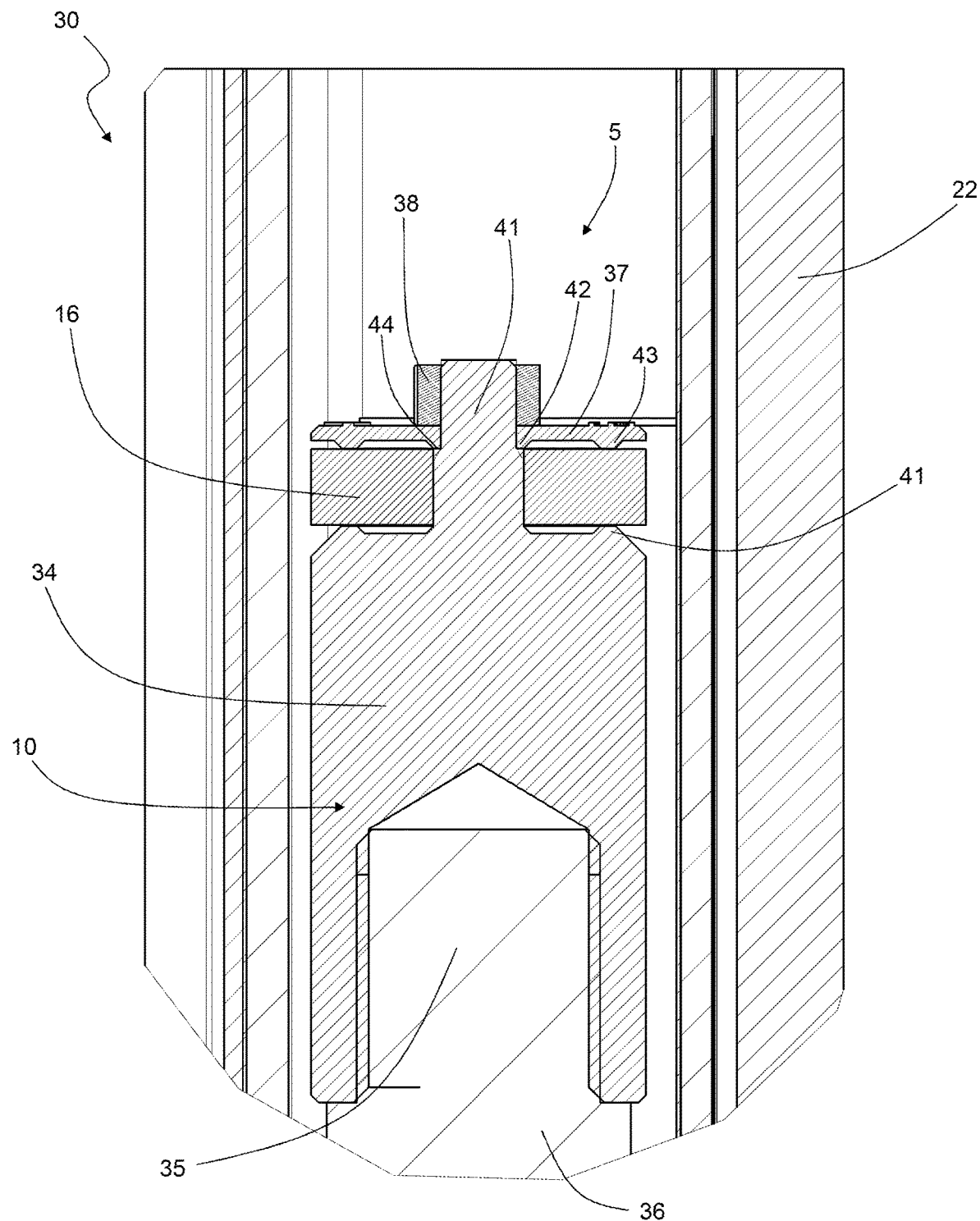
FIG. 4 shows a sectional view of the distal end of the actuator arrangement and the support structure, FIG. 5 a top view of the distal end of the actuator arrangement and support structure.

FIG. 3 shows a perspective detail view of the distal end 30 of the actuator arrangement 5 and the carrier structure 22 shown in FIG. 1. FIG. 4 shows a sectional view of the distal end 30 of the actuator arrangement 5 and the support structure 22.

As shown in FIG. 4, the actuator arrangement 5 has at its distal end 30 the actuator element 16, which is rotationally mounted on the actuator body. In order to fasten the actuator element 16 the actuator body 10 has a magnet holder 34, which is mounted on a distal end of the shaft section 36 of the actuator body 10. A cylindrical fastening section 35 is also provided at the distal end of the shaft section 36, which has a smaller diameter than the shaft section 36 and onto which the magnet holder 34 is screwed.

The actuator element 16 is rotationally mounted on the distal end of the magnet holder 34 facing away from the cylindrical fastening section 35. In the illustrated example the actuator element 16 is designed as an annular permanent magnet and is arranged coaxially with the magnet holder 34 and the shaft section 36.

A cylindrical projection 41 provided at the distal end of the magnet holder 34 engages in the annular opening of the actuator element 16. The actuator element 16 lies on an annular projection 41 that is provided on a front face at the distal end of the magnet holder. In this way the contact area between the magnet holder 34 and the actuator element 16 is reduced, so that the frictional forces opposing a rotational movement of the actuator element 16 relative to the magnet holder 34 are reduced. Alternatively or in addition to the described configuration, the actuator element 16 can also be mounted in a rotationally movable manner relative to the magnet holder 34 and shaft section 36 in another way.

For example, the actuator element 16 can also be mounted in a rotationally movable manner relative to the magnet holder 34 or shaft section 36 by means of a roller bearing, in particular a ball bearing.

The actuator element 16 is fastened to the magnet holder 34 by an annular disc 37 and a nut 38. The annular disc 37 has on its side facing the actuator element 16 an inner annular projection 42 and an outer annular projection 43. The inner annular projection 42 adjoins the annular opening of the annular disc 37 and is supported on an annular shoulder 44 provided on the cylindrical projection 41. The inner annular projection does not in this case touch the actuator element 16. The outer annular projection 43 has a larger radius than the inner annular projection 42 and has a slight clearance with respect to the actuator element 16. The outer annular projection 43 is dimensioned in the axial direction of the actuator arrangement 5 relative to the inner annular projection 41 in such a way that the contact pressure of the nut 38 acts mainly on the annular shoulder 44 and not on the actuator element 16. In this way the nut can be firmly tightened without substantially impairing the rotationally movable bearing of the actuator element 16.

Figure 5:
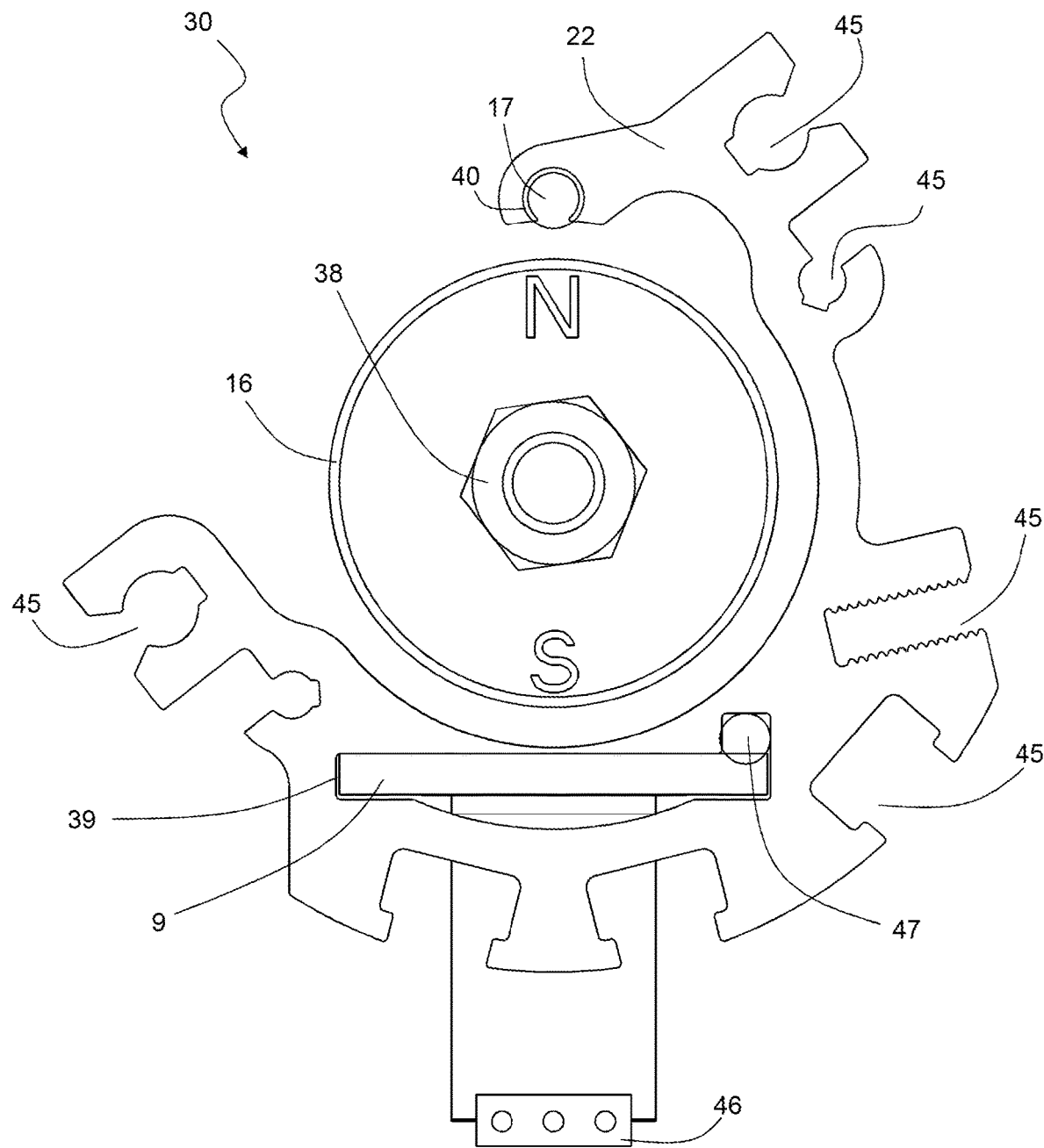

FIG. 5 shows a view from above of the distal end 30 of the actuator arrangement 5 and support structure 22.

As shown in FIG. 5, the support structure 22 has the basic shape of a hollow cylinder or cylinder jacket, wherein a circumferential section of the hollow or cylinder jacket is open or absent. On the outside of the support structure 22 there are provided by way of example various mechanical fastening interfaces 45, to which further components can be attached.

The support structure 22 has a first receptacle 39, in which the sensor device 9 is accommodated. In the illustrated example the sensor device 9 has a rectangular cross-section and the first receptacle 39 is designed to correspond thereto. In the illustrated example the first receptacle 39 has a substantially L-shaped cross-section. In order to fix the sensor device 9 in the receptacle 39 a round cord seal 47 is provided in the illustrated example, which presses the sensor device 9 into the receptacle 39 and thus fixes it in a frictional manner. The sensor device 9 is in this connection provided in a first rectangular section of the L-shaped cross-section and the round cord seal 47 is arranged in a second rectangular section of the L-shaped cross-section.

In the illustrated example the sensor device 9 is aligned in such a way that its normal vector intersects the longitudinal axis of the actuator arrangement 5 and the movement straight line 8.

The alignment arrangement 17, which is housed in a second receptacle 40 of the support structure 22, is provided opposite the sensor device 9. The alignment arrangement 17 is of rod-shaped design. The second receptacle 40 is accordingly formed as a cylindrical groove. The second receptacle 40 is designed to be open towards the actuator arrangement 5. In this way the alignment arrangement 17 can be arranged as close as possible to the actuator element 16, so that the magnetic forces acting on the actuator element 16 are maximised.

The first and second receptacles 39 and 40 each open out in an end face of the distal end 30 of the support structure 22.

The alignment arrangement 17 is arranged opposite the sensor device. A straight line connecting the alignment arrangement 17 and the sensor device 9 consequently intersects the movement straight line 8.

As indicated in FIG. 5 by the letters "N" and "S" the control element 16 designed as a ring magnet is magnetised diametrically, so that the pole direction of the actuator element 16 is perpendicular to the axial direction of the actuator arrangement 5 and movement straight line 8.

On account of the magnetic interaction with the alignment arrangement 17 the actuator element 16 adopts a rotational position, in which one of the magnetic poles (in the illustrated example the north pole "N") of the actuator element 16 lies as close as possible to the ferromagnetic alignment arrangement 17. In this rotational position of the actuator element 16 the other magnetic pole (the south pole "S" in the illustrated example) lies on the oppositely arranged sensor device 9. In this way it is ensured that the sensor device is located in the region of one of the poles and is thus permeated by a magnetic field region with maximum flux density.

In FIG. 5 an interface and/or processing unit 46 is also shown, which is connected to the sensor device 9 and serves to connect the sensor device 9 to a further, not shown, control unit and/or to read signals generated by the sensor device 9. If the sensor device is designed as a magnetic foil potentiometer, the interface and/or processing unit 46 can thus serve to read the impedance or electrical resistance of the foil potentiometer. This is done for example by means of an electrical signal, preferably a voltage signal.

The invention claimed is:

1. An actuator apparatus having a drive device and a monitoring device, wherein the drive device comprises an actuator arrangement, which can be displaced along a movement straight line, the actuator arrangement having an actuator body and a magnetic actuator element rotationally mounted on the actuator body, and wherein the monitoring device comprises a sensor device, which serves to detect at least one position of the magnetic actuator element along the movement straight line, and wherein the monitoring device comprises a magnetic alignment arrangement, which is arranged in such a way that the actuator element adopts, on account of a magnetic interaction between the actuator element and the alignment arrangement, a predetermined rotational position relative to the sensor device.

2. The actuator apparatus according to claim 1, wherein the sensor device serves to detect the at least one position of the actuator element on the basis of a magnetic interaction between the actuator element and the sensor device.

3. The actuator apparatus according to claim 1, wherein the actuator element comprises a permanent magnet.

4. The actuator apparatus according to claim 1, wherein the alignment arrangement contains a ferromagnetic material.

5. The actuator apparatus according to claim 1, wherein the magnetic alignment arrangement and/or the sensor device are formed elongated and extend parallel to the movement straight line.

6. The actuator apparatus according to claim 1, further comprising an elongated support carrier structure, which at least partially surrounds the actuator element and the longitudinal axis of which is aligned parallel to the movement straight line.

7. The actuator apparatus according to claim 6, wherein the sensor device and/or the alignment arrangement are arranged in a respective receptacle in the elongated support structure.

8. The actuator apparatus according to claim 1, wherein the pole direction of the magnetic field generated by the actuator element is aligned perpendicularly, to the movement straight line.

9. The actuator apparatus according to claim 1, wherein the sensor device is arranged opposite the alignment arrangement, so that a straight line passing through the sensor device and the alignment arrangement intersects the movement straight line.

10. The actuator apparatus according to claim 1, wherein the drive device comprises a valve drive and/or the monitoring device comprises a valve control head.

11. The actuator apparatus according to claim 1, further comprising a valve fitting having a valve member that is coupled to the actuator arrangement, so that the position of the valve member can be adjusted by displacing the actuator arrangement along the movement straight line.

12. The actuator device according to claim 1, wherein the actuator body includes a piston arrangement with a shaft section, wherein the actuator element is arranged on a distal end of the shaft section.

* * * * *